(12) United States Patent
Mishima et al.

(10) Patent No.: US 12,272,114 B2
(45) Date of Patent: Apr. 8, 2025

(54) LEARNING METHOD, STORAGE MEDIUM, AND IMAGE PROCESSING DEVICE

(71) Applicant: KABUSHIKI KAISHA TOSHIBA, Tokyo (JP)

(72) Inventors: Nao Mishima, Inagi (JP); Masako Kashiwagi, Ageo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 681 days.

(21) Appl. No.: 17/192,973

(22) Filed: Mar. 5, 2021

(65) Prior Publication Data

US 2021/0312233 A1 Oct. 7, 2021

(30) Foreign Application Priority Data

Apr. 7, 2020 (JP) ................. 2020-069159

(51) Int. Cl.
| | |
|---|---|
| *G06V 10/56* | (2022.01) |
| *G06F 18/214* | (2023.01) |
| *G06N 7/00* | (2023.01) |
| *G06N 20/00* | (2019.01) |
| *G06T 7/50* | (2017.01) |
| *G06V 10/46* | (2022.01) |

(52) U.S. Cl.
CPC .......... *G06V 10/56* (2022.01); *G06F 18/2148* (2023.01); *G06N 7/00* (2013.01); *G06N 20/00* (2019.01); *G06T 7/50* (2017.01); *G06T 2207/20081* (2013.01); *G06V 10/467* (2022.01)

(58) Field of Classification Search
CPC ........ G06V 10/56; G06V 10/467; G06T 7/50; G06T 2207/20081; G06N 20/00; G06N 7/00; G06F 18/2148

USPC ......................................................... 382/106
See application file for complete search history.

(56) References Cited

U.S. PATENT DOCUMENTS

| | | | |
|---|---|---|---|
| 2019/0014262 A1 | 1/2019 | Yamaguchi et al. | |
| 2020/0036895 A1* | 1/2020 | Midorikawa | ........... G06T 7/215 |
| 2020/0051264 A1 | 2/2020 | Mishima et al. | |

(Continued)

FOREIGN PATENT DOCUMENTS

| | | |
|---|---|---|
| JP | 2018-132477 A | 8/2018 |
| JP | 2019-15575 A | 1/2019 |

(Continued)

OTHER PUBLICATIONS

Sattar, "Human detection and distance estimation with monocular camera using YOLOv3 neural network", University of Tartu 2019 (Year: 2019).*

(Continued)

*Primary Examiner* — Mark Roz
(74) *Attorney, Agent, or Firm* — Oblon, McClelland, Maier & Neustadt, L.L.P.

(57) ABSTRACT

According to one embodiment, a learning method of causing a statistical model for outputting a distance to a subject to learn by using an image including the subject as an input is provided. The method includes acquiring an image for learning including a subject having an already known shape, acquiring a first distance to the subject included in the image for learning, from the image for learning, and causing the statistical model to learn by restraining the first distance with the shape of the subject included in the image for learning.

12 Claims, 7 Drawing Sheets

Image for learning (Image having no correct label)

Preliminarily trained statistical model

Distance of map format

Pseudo label

Fine tuning as correct label

(56) References Cited

U.S. PATENT DOCUMENTS

| | | | |
|---|---|---|---|
| 2020/0294260 A1 | 9/2020 | Kashiwagi et al. | |
| 2021/0082146 A1 | 3/2021 | Kashiwagi et al. | |

FOREIGN PATENT DOCUMENTS

| | | |
|---|---|---|
| JP | 2019-29021 A | 2/2019 |
| JP | 2020-26990 A | 2/2020 |
| JP | 2020-026990 A | 2/2020 |
| JP | 2020-148483 A | 9/2020 |
| JP | 2021-43115 A | 3/2021 |

OTHER PUBLICATIONS

Shah "A Novel Local Surface Description for Automatic 3D Object Recognition in Low Resolution Cluttered Scenes", IEEE 2013 (Year: 2013).*

Travnik, ("On Bokeh", https://jtra.cz/stuff/essays/bokeh/index.html, originally published 2011) (Year: 2011).*

Chatzitofis ("DeepMoCap: Deep Optical Motion Capture Using Multiple Depth Sensors and Retro-Reflectors", MDPI 2018) (Year: 2018).*

Sattar, "Human Detection and distance estimation with monocular camera using YOLOv3 neural network", University of Tartu, Jun. 14, 2016, pp. 1-43.

Lee, "Pseudo-Label: The Simple and Efficient Semi-Supervised Learning Method for Deep Neural Networks," ICML 2013 Workshop: Challenges in Representation Learning (WREPL), 2013, 7 pages.

Mishima et al., "Physical Cue based Depth-Sensing by Color Coding with Deaberration Network", BMVC, 2019, pp. 1-13, https://bmvc2019.org/wp-content/uploads/papers/0156-paper.pdf.

Romero-Ramirez et al., "Speeded Up Detection of Squared Fiducial Markers", Image and Vision Computing, vol. 76, 2018, 14 pages, DOI: 10.1016/j.imavis.2018.05.004.

* cited by examiner

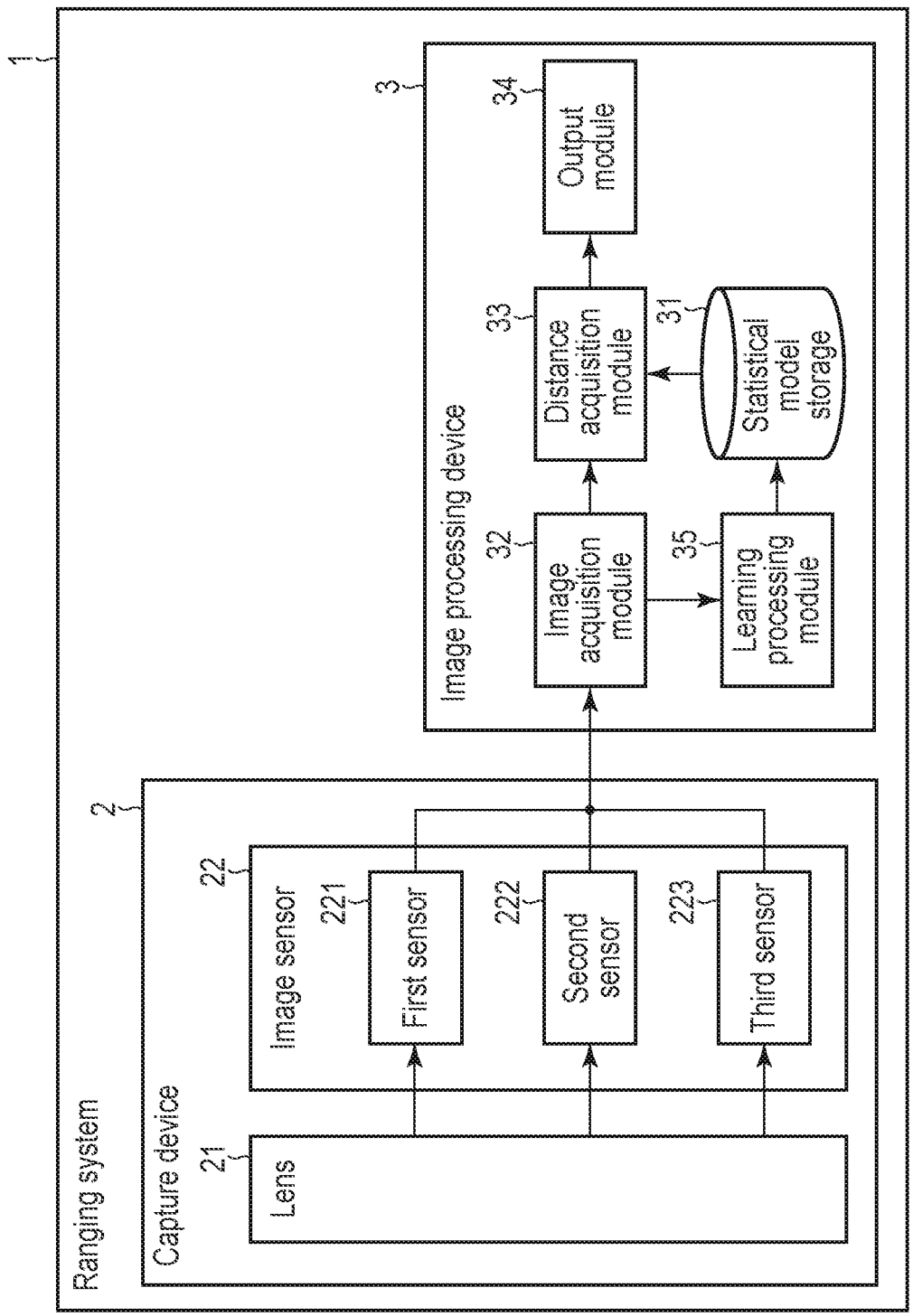
F I G. 1

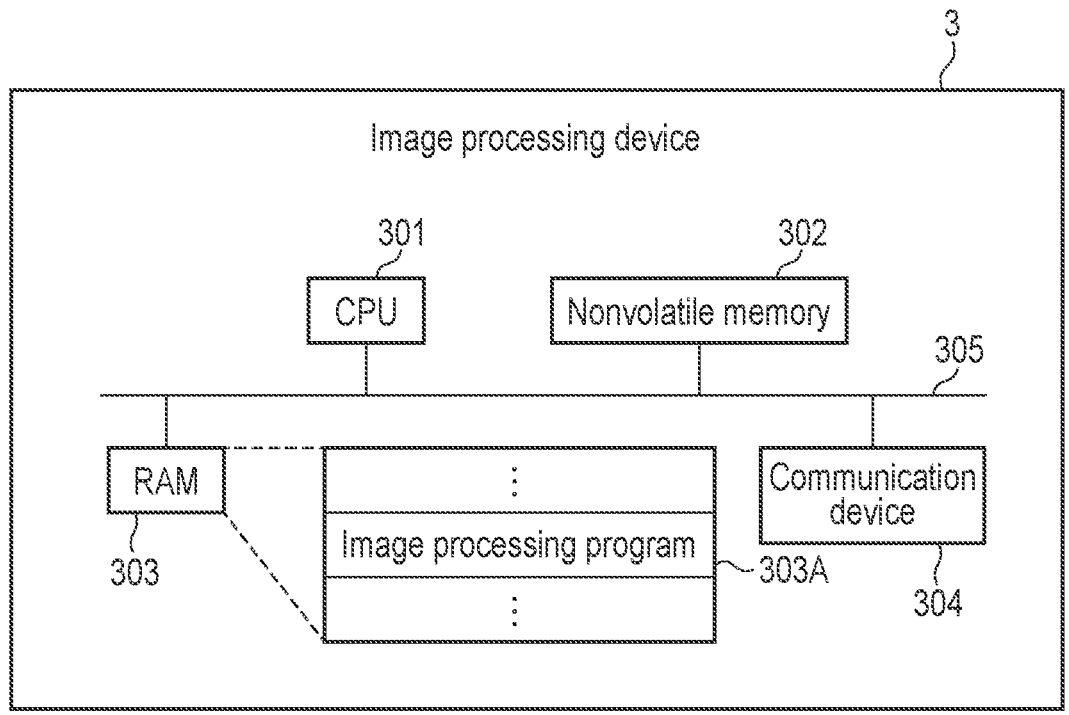
F I G. 2
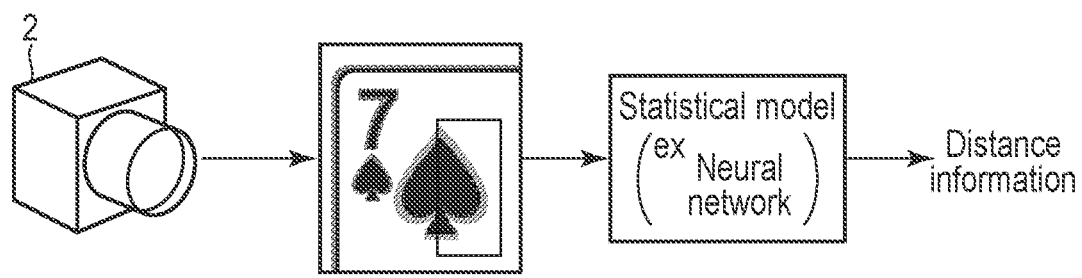
F I G. 3

LEARNING METHOD, STORAGE MEDIUM, AND IMAGE PROCESSING DEVICE

CROSS-REFERENCE TO RELATED APPLICATIONS

This application is based upon and claims the benefit of priority from Japanese Patent Application No. 2020-069159, filed Apr. 7, 2020, the entire contents of which are incorporated herein by reference.

FIELD

Embodiments described herein relate generally to a learning method, a storage medium, and an image processing device.

BACKGROUND

To obtain a distance to a subject, use of images captured by two capture devices (cameras) or a stereo camera (compound-eye camera) has been known. In recent years, a technology for acquiring the distance to the subject using images captured by a single capture device (monocular camera) has been developed.

To acquire the distance to the subject using images as described above, a statistical model generated by applying a machine learning algorithm such as a neural network may be used.

To generate a high-accuracy statistical model, however, a massive amount of data set for learning (a set including an image for learning and a correct value on the distance to the subject in the image for learning) needs to be learned by the statistical model, but preparing the data set is not easy.

BRIEF DESCRIPTION OF THE DRAWINGS

FIG. 1 is a diagram showing an example of a configuration of a ranging system according to the present embodiment.

FIG. 2 is a diagram showing an example of the system configuration of an image processing device.

FIG. 3 is a diagram illustrating an outline of operations of the ranging system.

DETAILED DESCRIPTION

Figure 4:
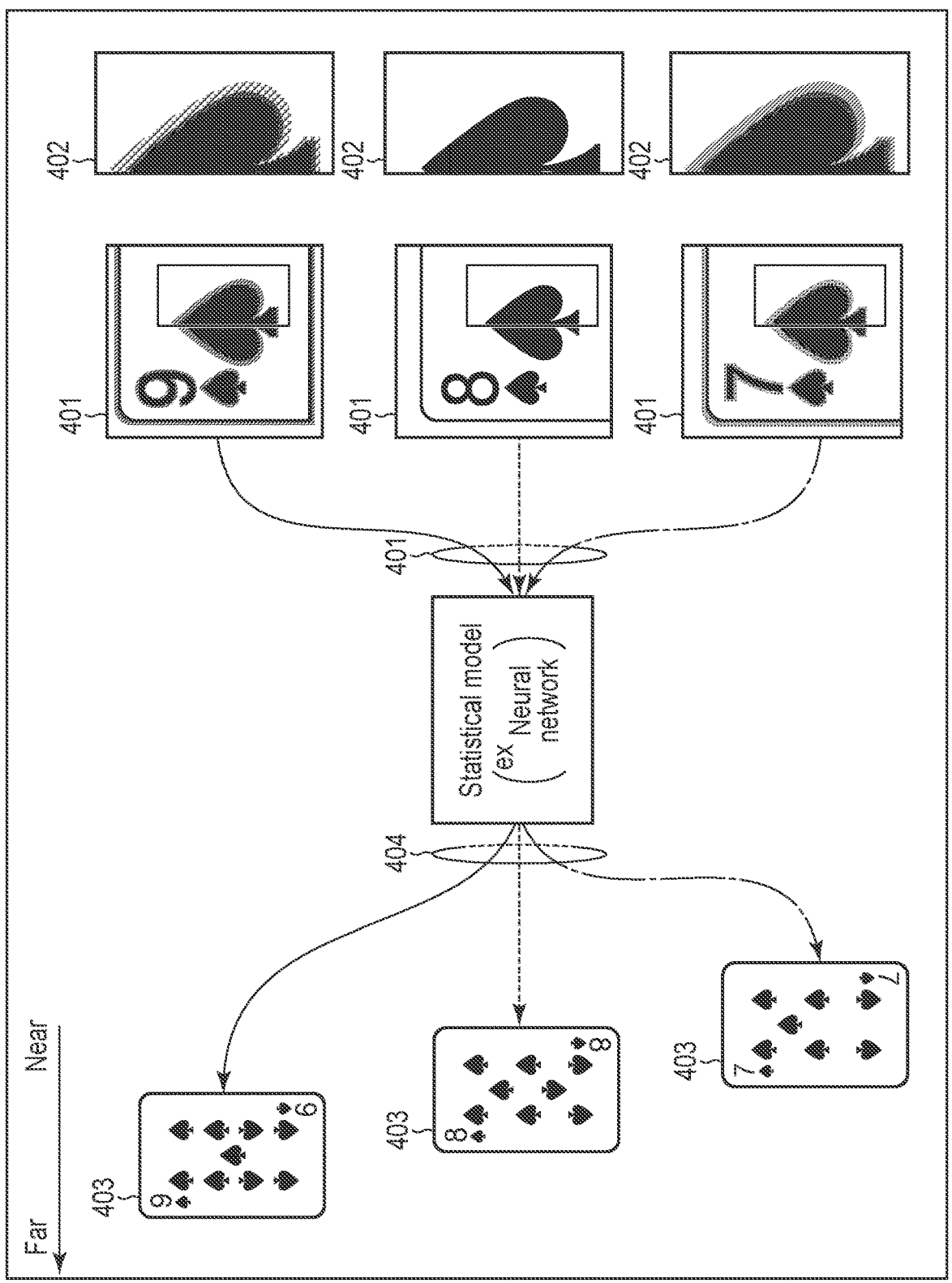
FIG. 4 is a diagram illustrating a principle of predicting the distance to a subject.

In general, according to one embodiment, a learning method of causing a statistical model for outputting a distance to a subject to learn by using an image including the subject as an input is provided. The method includes acquiring an image for learning including a subject having an already known shape, acquiring a first distance to the subject included in the image for learning, from the image for learning, and causing the statistical model to learn by restraining the first distance with the shape of the subject included in the image for learning.

Various embodiments will be described hereinafter with reference to the accompanying drawings.

FIG. 1 shows an example of the configuration of a ranging system according to the present embodiment. A ranging system 1 shown in FIG. 1 is used to capture an image and acquire (measure) a distance from a capture point to a subject with the captured image. Incidentally, the distance explained in the present embodiment may be indicative of an absolute distance or a relative distance.

As shown in FIG. 1, the ranging system 1 includes a capture device 2 and an image processing device 3. In the present embodiment, the ranging system 1 includes the capture device 2 and the image processing device 3 as separate devices. However, the ranging system 1 may be realized as a single device (ranging device) in which the capture device 2 functions as a capture unit and the image processing device 3 functions as an image processing unit. In addition, the image processing device 3 may operate as, for example, a server which executes various types of cloud computing services.

The capture device 2 is used to capture various types of images. The capture device 2 includes a lens 21 and an image sensor 22. The lens 21 and the image sensor 22 are equivalent to an optical system (monocular camera) of the capture device 2.

The light reflected on a subject is made incident on the lens 21. The light incident on the lens 21 is passed through the lens 21. The light passed through the lens 21 reaches the image sensor 22 and is received (detected) by the image sensor 22. The image sensor 22 generates an image consisting of a plurality of pixels by converting the received light into electric signals (photoelectric conversion).

Incidentally, the image sensor 22 is realized by, for example, a charge coupled device (CCD) image sensor, a complementary metal oxide semiconductor (CMOS) image sensor, and the like. The image sensor 22 includes, for example, a first sensor (R sensor) 221 which detects light having a red (R) wavelength band, a second sensor (G sensor) 222 which detects light having a green (G) wavelength band, and a third sensor (B sensor) 223 which detects light having a blue (B) wavelength band. The image sensor 22 can receive the light of the corresponding wavelength bands by the first to third sensors 221 to 223, and generate sensor images (R image, G image, and B image) corresponding to the respective wavelength bands (color components). That is, the image captured by the capture device 2 is a color image (RGB image) and includes an R image, a G image and a B image.

Incidentally, in the present embodiment, the image sensor 22 including the first to third sensors 221 to 223 is described. However, the image sensor 22 may be configured to include at least one of the first to third sensors 221 to 223. In addition, the image sensor 22 may be configured to include, for example, a sensor for generating a monochrome image instead of the first to third sensors 221 to 223.

In the present embodiment, the image generated based on the light passed through the lens 21 is an image affected by the aberration of the optical system (lens 21), and includes bokeh which occurs by the aberration.

The image processing device 3 shown in FIG. 1 includes, as functional components, statistical model storage 31, an image acquisition module 32, a distance acquisition module 33, an output module 34, and a learning processing module 35.

In the statistical model storage 31, a statistical model used to acquire the distance to a subject from an image captured by the capture device 2 is stored. The statistical model stored in the statistical model storage 31 is generated by learning the bokeh which occurs in an image affected by the above aberration of the optical system and which changes nonlinearly in accordance with the distance to a subject in the image. According to the statistical model, when the image is input to the statistical model, the distance to the subject in the image can be predicted (output) as a predictive value corresponding to the image.

Incidentally, the statistical model can be generated by applying, for example, various types of known machine learning algorithms such as a neural network or random forest. In addition, the neural network applicable to the present embodiment may include, for example, convolutional neural network (CNN), fully connected neural network, recursive neural network, and the like.

The image acquisition module 32 acquires the image captured by the capture device 2 from the capture device 2 (image sensor 22).

The distance acquisition module 33 acquires distance information indicating the distance to the subject in the image, by using the image acquired by the image acquisition module 32. In this case, the distance acquisition module 33 acquires the distance information indicating the distance to the subject in the image by inputting the image to the statistical model stored in the statistical model storage 31.

The output module 34 outputs the distance information acquired by the distance acquisition module 33 in, for example, a map form in which the distance information is associated in position with an image. In this case, the output module 34 can output image data consisting of pixels in which the distance indicated by the distance information is a pixel value (i.e., output the distance information as the image data). When the distance information is thus output as the image data, the image data can be displayed as, for example, a distance image indicating the distance by colors. For example, the distance information output by the output module 34 can also be used to calculate the size of a subject in the image captured by the capture device 2.

The learning processing module 35 executes, for example, a process of causing the statistical model stored in the statistical model storage 31 to learn by using an image acquired by the image acquisition module 32. The details of the process executed by the learning processing module 35 will be described later.

Incidentally, in the example shown in FIG. 1, the image processing device 3 includes the modules 31 to 35. For example, however, the image processing device 3 may include, for example, a ranging device which includes the image acquisition module 32, the distance acquisition module 33 and the output module 34, and a learning device which includes the statistical model storage 31, the image acquisition module 32, and the learning processing module 35.

FIG. 2 shows an example of the system configuration of the image processing device 3 shown in FIG. 1. The image processing device 3 includes a CPU 301, a nonvolatile memory 302, a RAM 303, and a communication device 304. In addition, the image processing device 3 includes a bus 305 which interconnects the CPU 301, the nonvolatile memory 302, the RAM 303, and the communication device 304.

The CPU 301 is a processor which controls the operations of various components in the image processing device 3. The CPU 301 may be a single processor or may be composed of a plurality of processors. The CPU 301 runs various programs loaded from the nonvolatile memory 302 into the RAM 303. These programs include an operating system (OS) and various application programs. The application programs include an image processing program 303A.

The nonvolatile memory 302 is a storage medium used as an auxiliary storage device. The RAM 303 is a storage medium used as a main storage device. FIG. 2 shows only the nonvolatile memory 302 and the RAM 303. However, the image processing device 3 may include, for example, the other storage devices such as a hard disk drive (HDD) and a solid state drive (SDD).

Incidentally, in the present embodiment, the statistical model storage 31 shown in FIG. 1 is realized by, for example, the nonvolatile memory 302 or the other storage device or the like.

In addition, in the present embodiment, several or all modules of the image acquisition module 32, the distance acquisition module 33, the output module 34, and the learning processing module 35 shown in FIG. 1 cause the CPU 301 (i.e., the computer of the image processing device 3) to run the image processing program 303A, i.e., are realized by software. The image processing program 303A may be stored in a computer-readable storage medium and distributed, or may be downloaded into the image processing device 3 through a network.

Causing the CPU 301 to run the image processing program 303A has been described. However, several or all modules of the modules 32 to 35 may be realized by using, for example, a GPU (not shown) instead of the CPU 301. In addition, several or all modules of the modules 32 to 35 may be realized by hardware such as an integrated circuit (IC) or a combination of software and hardware.

The communication device 304 is a device configured to execute wired communication or wireless communication. The communication device 304 includes a transmitter which transmits a signal and a receiver which receives a signal. The communication device 304 executes communication with an external device via a network, communication with an external device present around the communication device 304, and the like. The external device includes the capture device 2. In this case, the image processing device 3 can receive an image from the capture device 2 via the communication device 304.

Although omitted in FIG. 2, the image processing device 3 may further include, for example, an input device such as a mouse or keyboard, and a display device such as a display.

Next, an outline of the operation of the ranging system 1 in the present embodiment will be described with reference to FIG. 3.

In the ranging system 1, the capture device 2 (image sensor 22) generates an image affected by the aberration of the optical system (lens 21) as described above.

The image processing device 3 (image acquisition module 32) acquires an image generated by the capture device 2 and inputs the image to the statistical model stored in the statistical model storage 31.

According to the statistical model of the present embodiment, the distance (predictive value) to a subject in the image input as described above is output. The image processing device 3 (distance acquisition module 33) can thereby acquire the distance information indicating the distance output from the statistical model (i.e., the distance to the subject in the image).

Thus, in the present embodiment, the distance information can be acquired from the image captured by the capture device 2 using the statistical model.

A principle of predicting the distance to the subject in the present embodiment will be simply explained here with reference to FIG. 4.

An image captured by the capture device 2 (hereinafter referred to as a captured image) includes bokeh caused by the aberration of the optical system of the capture device 2 (lens aberration) as described above. More specifically, the refractive index of light passed through the lens 21 having aberration differs depending on the wavelength band. Thus, for example, when the position of the subject is out of the focal position (i.e., the position in focus in the capture device 2), the light of various wavelength bands is not concentrated at one point, but reaches different points. This emerges as bokeh (chromatic aberration) on the image.

In addition, in the captured image, bokeh (color, size, and shape) changing nonlinearly in accordance with the distance to the subject in the captured image (i.e., the position of the subject with respect to the capture device 2) is observed.

For this reason, in the present embodiment, as shown in FIG. 4, bokeh (bokeh information) 402 which occurs in a captured image 401 is analyzed as a physical clue related to the distance to a subject 403, in the statistical model, and the distance 404 to the subject 403 is thereby predicted.

An example of a method of predicting the distance from the captured image in the statistical model will be described below. The patch method and the image based method will be described here.

Figure 5:
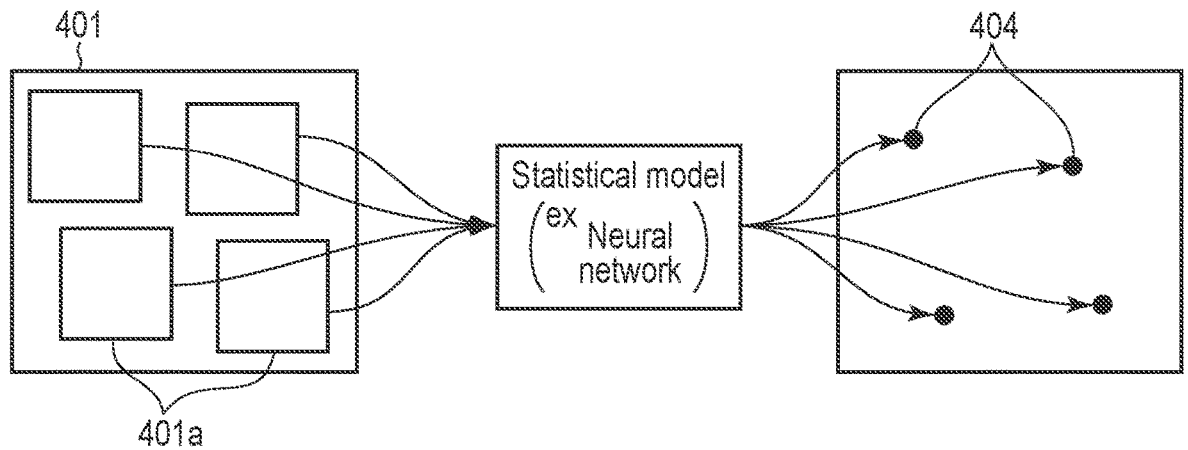
FIG. 5 is a diagram illustrating a patch method for predicting the distance from a captured image.

First, the patch method will be described with reference to FIG. 5. In the patch method, local areas (hereinafter referred to as image patches) 401a are cut out (extracted) from the captured image 401.

In this case, for example, the entire area of the captured image 401 may be divided in a matrix and the divided partial areas may be cut out in series as the image patches 401a. Alternatively, the captured image 401 may be recognized and the image patches 401a may be cut out to cover the area in which the subject (image) is detected. Incidentally, the image patch 401a may partially overlap the other image patches 401a.

In the patch method, the distance is output as a predictive value corresponding to each image patch 401a cut out as described above. That is, in the patch method, each image patch 401a cut out from the captured image 401 is used as an input, and the distance 404 to the subject included in the image patch 401a is predicted.

Figure 6:
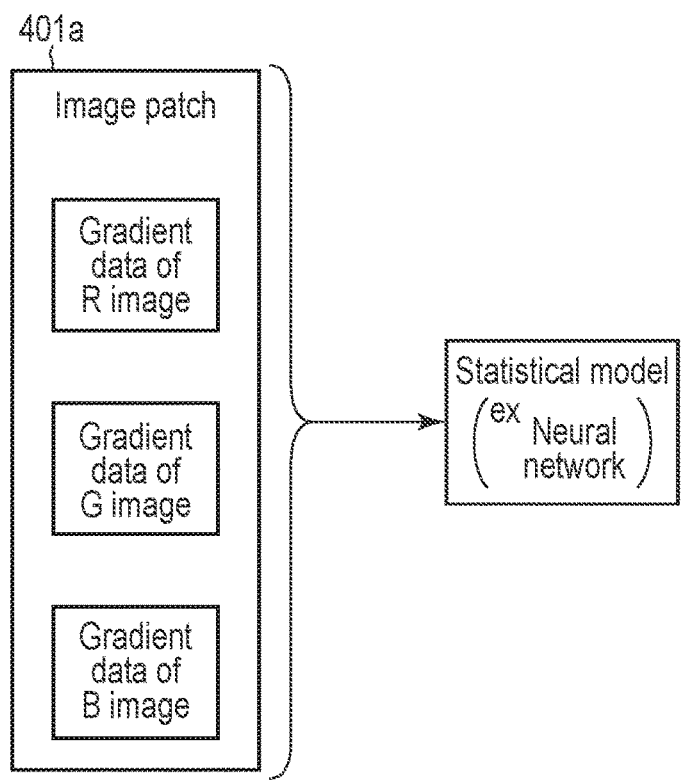
FIG. 6 is a diagram showing an example of information related to an image patch.

FIG. 6 shows an example of information related to the image patch 401a input to the statistical model in the above-described patch method.

In the patch method, gradient data of the image patches 401a cut out from the captured image 401 for respective R image, G image and B image included in the captured image 401 (i.e., gradient data of the R image, gradient data of the G image, and gradient data of the B image) are generated. The gradient data generated in this manner are input to the statistical model.

Incidentally, the gradient data is equivalent to the difference (difference value) in pixel value between each pixel and a pixel adjacent to the pixel. For example, when the image patch 401a is extracted as a rectangular area of n pixels (X-axis direction)×m pixels (Y-axis direction), gradient data in which the difference values from, for example, the pixels adjacent on the right side as calculated with respect to the respective pixels in the image patch 401a are arranged in a matrix of n rows×m columns, (i.e., the gradient data of each pixel) is generated.

The statistical model uses the gradient data of the R image, the gradient data of the G image, and the gradient data of the B image to predict the distance from the bokeh produced in each of the images. FIG. 6 shows a case where the gradient data of each of the R image, the G image, and the B image is input to the statistical model. However, the gradient data of an RGB image may be input to the statistical model.

Figure 7:
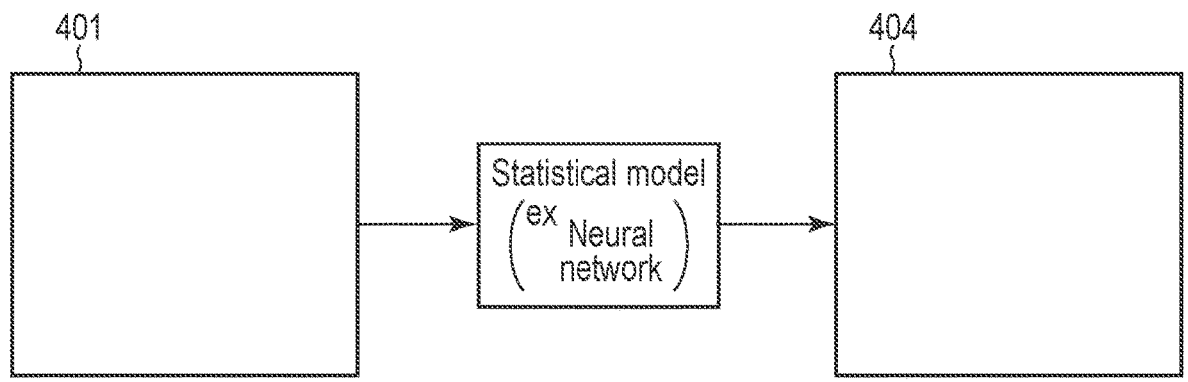
FIG. 7 is a diagram illustrating an image based method for predicting the distance from a captured image.

Next, the image based method will be described with reference to FIG. 7. In the image based method, the above-described cutout of the image patches 401a is not executed.

In the image based method, (information on) the entire area of the captured image 401 is input to the statistical model, and the distance is output from the statistical model as a predictive value corresponding to the entire area. That is, in the image based method, the distance 404 to the subject included in the entire area of the captured image 401 is predicted by using the entire area of the captured image 401 as an input.

Incidentally, the information related to the entire area as input to the statistical model in the image based method is, for example, the above-described gradient data of (each of pixels configuring) the R image, the G image, and the B image.

In addition, in the image based method, since the entire area of the captured image 401 is input to the statistical model, the context extracted from the captured image 401 (entire area) can be used for the above-described prediction of the distance. Incidentally, the context is equivalent to a feature amount related to the line segment, color distribution, and the like in the captured image 401. In addition, the context also includes the feature of the subject (i.e., the shape of a person, the shape of a building, and the like).

In the present embodiment, (the distance information indicating) the distance from the image to the subject included in the image can be acquired by using the statistical model as described above. To improve the accuracy of the distance output from the statistical model, however, the statistical model needs to learn.

Figure 8:
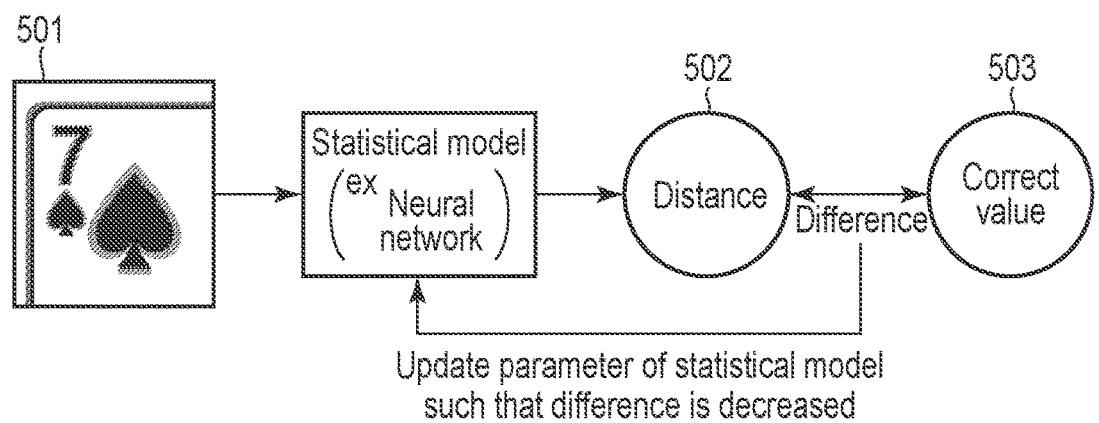
FIG. 8 is a diagram illustrating an outline of a general statistical model learning method.

An outline of a general statistical model learning method will be described below with reference to FIG. 8. When either the patch method or the image based method is used, learning of the statistical model is basically executed in the flow shown in FIG. 8. More specifically, learning of the statistical model is executed by inputting information related to an image (hereinafter referred to an image for learning) 501 prepared for learning to the statistical model and feeding back the difference between the distance 502 output (predicted) from the statistical model and a correct value 503 to the statistical model. Incidentally, the correct value 503 indicates an actual distance (actual value) from the capture point of the image for learning 501 to the subject included in the image for learning 501 and is also referred to, for example, a correct label or the like. In addition, feeding back refers to updating the parameter (for example, the weight coefficient) of the statistical model so as to decrease the difference.

More specifically, when the patch method is applied, information (gradient data) on the image patch (local area) is input to the statistical model for each image patch cut out from the image for learning 501. The distance 502 of the pixel corresponding to each image patch is output by the statistical model. A difference obtained by comparing the distance 502 thus output with the correct value 503 is fed back to the statistical model.

In addition, when the image based method is applied, information (gradient data) on the entire area of the image for learning 501 is collectively input to the statistical model. The distance 502 of each of the pixels configuring the image for learning 501 is output by the statistical model. A difference obtained by comparing the distance 502 thus output with the correct value 503 is fed back to the statistical model.

Incidentally, to cause the statistical model to learn, the image for learning which is assigned the correct label (correct value) described with reference to FIG. 8 (i.e., a data set for learning including the image for learning and the correct label which is the distance to be acquired from the image for learning) needs to be prepared. To obtain the correct label, however, the actual distance to the subject included in the image for learning needs to be measured every time the image for learning is captured, which is complicated. In addition, since a number of data sets for learning need to be learned by the statistical model to improve the accuracy of the statistical model, a number of data sets for learning cannot easily be prepared.

Thus, the present embodiment provides a configuration for implementing learning of the statistical model which does not need the correct label.

Figure 9:
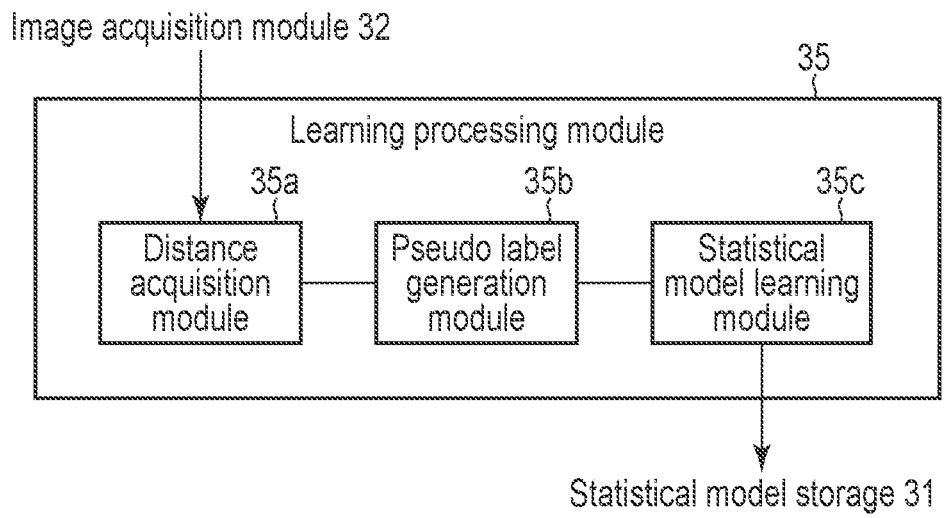
FIG. 9 is a block diagram showing an example of a functional configuration of a learning processing module.

The learning processing module 35 included in the image processing device 3 shown in FIG. 1 will be described below in detail. FIG. 9 is a block diagram showing an example of a functional configuration of the learning processing module 35.

As shown in FIG. 9, the learning processing module 35 includes a distance acquisition module 35a, a pseudo label generation module 35b, and a statistical model learning module 35c.

When causing the statistical model to learn in the present embodiment, the image acquisition module 32 included in the image processing device 3 acquires an image which is not assigned the above-described correct label (i.e., an image having no teaching) as the image for learning. Incidentally, it is assumed that the image for learning includes a subject of an already known shape (i.e., a subject having an already known shape), in the present embodiment.

The distance acquisition module 35a acquires the distance to the subject included in the image for learning from the image for learning acquired by the image acquisition module 32. In this case, the distance acquisition module 35a inputs the image for learning to the statistical model stored in the statistical model storage 31 and acquires the distance of each of the pixels configuring the image for learning output from the statistical model.

The distance acquisition module 35a acquires the distance by using the statistical model. However, the distance may be (the predictive value of) the distance acquired from the image for learning or, for example, the distance acquired based on a two-dimensional code such as an AR marker attached to the subject included in the image for learning (i.e., the distance to the AR marker).

The pseudo label generation module 35b generates the pseudo label by restraining the distance acquired by the distance acquisition module 35a with the shape (i.e., already known shape) of the subject included in the image for learning.

In the above-described distance acquisition module 35a, the distance of each of the pixels configuring the image for learning is acquired. In the present embodiment, "restraining the distance with the already known shape of the subject" indicates supplying the information of the already known shape of the subject to the distance and, more specifically, correcting the distance based on the already known shape of the subject such that the distance of each of the pixels configuring the image for learning is adapted to the already known shape. In addition, the pseudo label indicates the distance corrected by being restrained based on the already known shape of the subject.

The statistical model learning module 35c causes the statistical model stored in the statistical model storage 31 to relearn by using the pseudo label generated by the pseudo label generation module 35b as the correct label. The statistical model whose relearning is completed by the statistical model learning module 35c is stored in the statistical model storage module 31 (i.e., overwritten to the statistical model stored in the statistical model storage 31).

As described above, the learning processing module 35 is configured to acquire the distance to the subject having the already known shape from the image for learning and to cause the statistical model to learn by restraining the distance with the already known shape of the subject.

Figure 10:
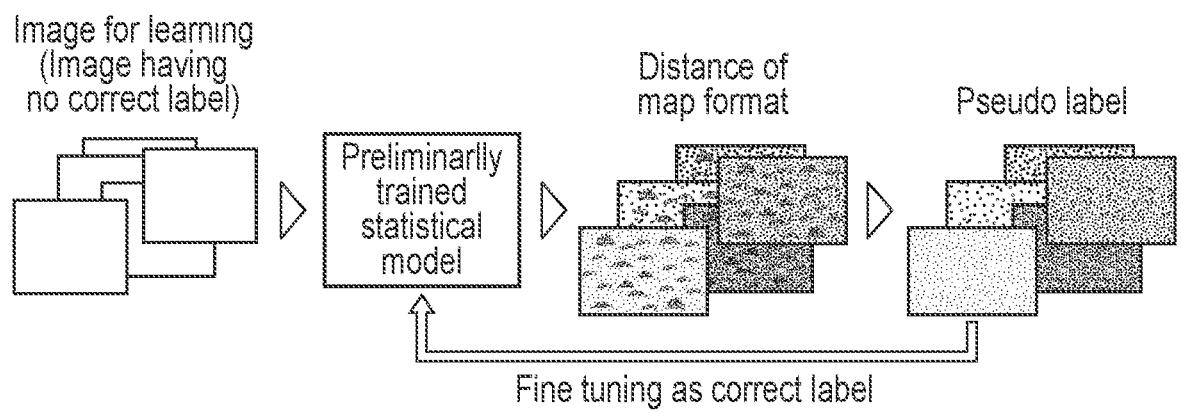
FIG. 10 is a diagram showing an outline of an operation of the learning processing module.

Next, the operation of the learning processing module 35 will be described. FIG. 10 shows an outline of the operation of the learning processing module when causing the statistical model to learn.

In the present embodiment, it is assumed that the trained statistical model is prepared in advance and that the statistical model is further caused to learn.

More specifically, the learning processing module 35 inputs the image for learning (i.e., the image assigned with no correct label) to the trained statistical model prepared in advance (i.e., the statistical model stored in the statistical model storage 31) and thereby acquires the distance (for example, the distance of a map format) for each of the pixels configuring the image for learning output from the statistical model, as shown in FIG. 10.

Furthermore, the learning processing module 35 generates the pseudo label by restraining the distance of each pixel with the already known shape (for example, a plane shape) of the subject, and executes fine tuning (relearning) of the statistical model by using the generated pseudo label as the correct label.

In the present embodiment, by operating as described above, the learning processing module 35 can cause the statistical model to learn the image for learning even when the correct label (i.e., the actually measured distance) is not assigned to the image for learning.

An example of a procedure of the image processing device 3 when causing the statistical model to learn will be described with reference to a flowchart of FIG. 11.

The trained statistical model (preliminarily trained model) is stored in the statistical model storage 31 in advance. For example, however, the statistical model may be generated by learning the image captured by the capture device 2 or generated by learning the image captured by a capture device (or a lens) different from the capture device 2. That is, in the present embodiment, the statistical model for outputting the distance to the subject included in the image by using at least the image as the input may be prepared in advance.

First, the distance acquisition module 35a acquires the image for learning acquired by the image acquisition module 32 (i.e., the image captured by the capture device 2) (step S11). Incidentally, the capture device 2 capturing the image for learning may be any camera system equipped with any lens and does not need to be a capture device capturing the image learned in advance by the above-described statistical model. In addition, a plurality of images for learning or one image for learning may be acquired in step S1.

The image for learning acquired in step S11 includes the subject of the already known shape as described above and, in the present embodiment, the already known shape includes, for example, a plane shape. In this case, a television monitor can be used as the subject included in the image for learning. When the television monitor is thus used as the subject, various images can be changed and displayed on the television monitor. Various (images for learning of) color patterns can be thereby learned by the statistical model.

Using the television monitor having a plane shape as the subject will be described here. However, the subject may be, for example, the other object having any shape such as a cube, a rectangular parallelepiped or a sphere.

Next, the distance acquisition module 35a acquires the distance output from the statistical model by inputting (the information on) the image for learning acquired in step S11 to the statistical model (step S2). In step S2, the gradient data of each of the pixels configuring the image for learning is input to the statistical model, and the distance for each pixel output from the statistical model is thereby acquired.

In the present embodiment, the statistical model used to acquire the distance in step S2 is, for example, the statistical model learning the image captured by a capture device (or a lens) different from the capture device 2 capturing the image for learning (i.e., the statistical model insufficient for learning of the image captured by the capture device 2). The distance acquired in step S2 is therefore a value of comparatively low accuracy.

For this reason, the pseudo label generation module 35b generates the pseudo label by restraining the distance acquired in step S2 with the already known shape of the subject included in the image for learning acquired in step S1 (step S3). Incidentally, (the information indicating) the already known shape of the subject included in the image for learning may be, for example, input from the outside of the image processing device 3 and managed in advance inside the image processing device 3 (learning processing module 35).

The process of step S3 will be described below in detail. In step S3, parameterization of the already known shape (i.e., the shape to be restrained) of the subject included in the image for learning is generated (or acquired), the parameterization is fit to the distance acquired in step S2, and the distance is thereby restrained with the already known shape of the subject. In this case, the distance acquired in step S2 is corrected based on the parameter used for the parameterization, and the corrected distance can be used as the pseudo label.

It is assumed here that the already known shape of the subject is a plane shape. In this case, when coordinate values of a point in a three-dimensional space are referred to as x, y, and z, the plane in the three-dimensional space can be represented by the parameterization (function) such as formula (1), and the formula (1) can be further represented similarly to formula (2).

$$ax+by+c=z \qquad \text{Formula (1)}$$

$$z=g(x,y;\phi) \qquad \text{Formula (2)}$$

In formula (2), $\phi$ corresponds to a, b, and c in formula (1) and is a parameter of a plane shape. The formulas (1) and (2) represent a plane shape by a set of points (x, y, and z) satisfying the parameter $\phi$. Incidentally, according to the above formula (2), the z coordinate (i.e., distance) can be represented (calculated) by using the x coordinate, the y coordinate, and the parameter $\phi$.

In the present embodiment, when the distance of each of the pixels acquired in step S2 is referred to as z, a fitting problem of the parameter $\phi$ for the distance z results in an optimization problem such as the following formula (3).

$$\phi' = \arg\min_{\phi} \sum (g(x, y; \phi) - z)^2 \qquad \text{Formula (3)}$$

In the formula (3), a general least square method is employed. According to the formula (3), parameter $\phi'$ by which the total difference between the distance ($g(x,y; \phi)$) calculated by using the formula (2) and the distance z of the pixel acquired in step S2 becomes smallest for each of the pixels (i.e., each of the pixels having the coordinates x and y) configuring the image for learning (i.e., the parameter after fitting) can be obtained.

Incidentally, since the distance acquired in step S2 includes much noise, the parameter $\phi'$ obtained by using the formula (3) is considered to be affected by the noise. For this reason, for example, ransom sample consensus (RANSAC) having a high robustness to the noise or the like may be used when the parameter $\phi'$ is obtained.

Next, the pseudo label generation module 35b generates the pseudo label of each of the pixels configuring the image for learning by using the parameter $\phi'$ obtained by the above formula (3) (i.e., the parameter after fitting). For example, pseudo label z' of a pixel (hereinafter simply referred to as a pixel (x, y)) whose coordinate values are x and y is generated (calculated) by using the following formula (4).

$$z'=g(x,y;\phi') \qquad \text{Formula (4)}$$

According to the formula (4), the pseudo label z' of the pixel (x, y) can be generated (calculated) by applying the parameter $\phi'$ obtained by the formula (3) to the above formula (2).

The case where the already known shape of the subject included in the image for learning is the plane shape has been described. However, the already known shape may be the other shape if it can be parameterized (i.e., expressed with any function composed of a plurality of parameters).

When the process in step S3 is executed, the statistical model learning module 35c causes the statistical model stored in the statistical model storage 31 to learn by using the pseudo label generated in step S3 (i.e., the distance of each of the pixels) as the correct label (step S4). In other words, the statistical model learning module 35c cause the statistical model to learn the data set for learning including both the image for learning acquired in step S1 and the pseudo label of each of the pixels configuring the image for learning, which is generated in step S3.

The process of step S4 will be described below in detail. The statistical model which is used to acquire the distance of the subject included in image for learning I and in which the parameter (for example, weight or the like) is $\theta$ is referred to as f (I, x, y; $\theta$). When the gradient data of the pixel configuring the image for learning I (i.e., the pixel whose coordinate values are x and y) is input, the statistical model f (I, x, y; $\theta$) outputs the distance corresponding to the pixel. In the following descriptions, the distance corresponding to the pixel output from the statistical model by inputting the gradient data of the pixel configuring the image for learning I is simply referred to as a predictive value corresponding to the pixel.

In the present embodiment, first to third learning methods will be described as the method of causing the statistical model to learn.

First, a first learning method will be described. The first learning method corresponds to a method of directly teaching the statistical model with the above-described pseudo label. More specifically, in the first learning method, the statistical model is caused to learn with the following formula (5) for minimizing a value of a loss function.

$$\theta' = \arg\min_\theta \sum_{(x,y,z',I)\in N} |z' - f(I, x, y; \theta)| \qquad \text{Formula (5)}$$

In the formula (5), N refers to a set of images for learning I, including a tuple (x, y, z', I) of the coordinates x and y of the pixels configuring the images for learning I, the pseudo label z' of the pixels, and the images for learning I. In addition, in the formula (5), f (I, x, y; θ) refers to the statistical model as described above.

That is, the loss function in the formula (5) indicates calculating and summing differences between pseudo labels z' of the pixels configuring the images for learning I and the predictive values corresponding to the pixels (i.e., distances output from the statistical model), with respect to all the pixels configuring the images for learning I included in N. According to the formula (5), the parameter θ' that makes the sum of the differences minimum can be obtained.

In the first learning method, it is possible to cause the statistical model to learn the image for learning by updating the parameter θ' of the statistical model to the parameter θ' obtained by using the above formula (5).

Incidentally, in the formula (5), the loss function using L1 norm is indicated. However, the loss function to obtain the parameter θ' may be a loss function using L2 norm or, for example, a loss function using heteroscedasticity.

Next, a second learning method will be described. In the above-described first learning method, the statistical model is directly taught with the pseudo label. However, the second learning method corresponds to the method of applying restriction of the already known shape to the parameter of the statistical model by further adding the regularization term. More specifically, in the second learning method, the statistical model is caused to learn (regularize) with the following formula (6) for minimizing a value of an objective function adding a regularization term to the loss function.

$$\theta' = \arg\min_\theta \lambda_1 \sum_{(x1,y1,z1',I)\in N} |z1' - f(I, x1, y1; \theta)| + \qquad \text{Formula (6)}$$

$$\lambda_2 \sum_{(x1,y1,z1',I),(x2,y2,z2',I)\in N} |(z1' - z2') -$$

$$(f(I, x1, y1; \theta) - f(I, x2, y2; \theta))|$$

In the second learning method, coordinate values of one pixel (hereinafter referred to as a first pixel) configuring the image for learning I are referred to as x1 and y1, and coordinates of one pixel (hereinafter referred to as a second pixel) which configures the image for learning I and which is different from the first pixel are referred to as x2 and y2. In addition, a pseudo label of the first pixel is referred to as z1' and a pseudo label of the second pixel is referred to as z2'.

In this case, the loss function in the formula (6) is the same as the loss function in the formula (5) except a feature that x, y, and z' in the formula (5) used in the first learning method are replaced with x1, y1, and z1'.

In contrast, in the formula (6), N in the regularization term refers to a set of images for learning I, including a tuple (x1, y1, z1', I) of the first pixel and a tuple (x2, y2, z2', I) of the second pixel configuring the images for learning I.

In addition, the regularization term in the formula (6) refers to calculating and summing differences between relative values of the pseudo label and relative values of the predictive value with respect to all the pixels configuring the images for learning I included in N. Incidentally, the relative value of the pseudo label corresponds to a difference between pseudo label z1' of the first pixel and the pseudo label z2' of the second pixel. In addition, the relative value of the predictive value corresponds to a difference between the predictive value corresponding to the first pixel and the predictive value corresponding to the second pixel. In addition, in the regularization term in the formula (6), "calculating the differences with respect to all the pixels configuring the images for learning I included in N" indicates calculating the differences by using each of the pixels configuring the images for learning I as the first pixel. Incidentally, any one pixel may be selected as the second pixel in this case, for the first pixel.

According to the above formula (6), the parameter θ' by which a value obtained by adding the value of regularization term to the value of the loss function in the formula (6) becomes minimum can be obtained.

In the second learning method, it is possible to cause the statistical model to learn the image for learning by updating the parameter θ' of the statistical model to the parameter θ' obtained by using the above formula (6).

Incidentally, the loss function (first term) in the formula (6) is weighted by any parameter 11 and the loss function (second term) in the formula (6) is weighted by any parameter $\lambda_2$. However, each of the parameters $\lambda_1$ and $\lambda_2$ may be a value of 0 or more. That is, for example, when $\lambda_2=0$, the same learning as the first learning method (i.e., formula (5)) can be executed and, when $\lambda_1=0$, the learning using (the objective function including) the only regularization term can be executed.

Next, a third learning method will be described. The above first and second learning methods are generally referred to as unsupervised learning since the image for learning which is not assigned the correct label is learned in the methods. However, the third learning method corresponds to supervised learning in which the correct label is assigned to (the pixel configuring) a part of the image for learning.

That is, when the third learning method is applied, the image for learning (first image for learning) to which the correct label is assigned and the image for learning (second image for learning) to which the correct label is not assigned are acquired in step S1. Incidentally, it is assumed that the subject of the same shape is included in both the image for learning to which the correct label is assigned and the image for learning to which the correct label is not assigned. In addition, the above-described processes in steps S2 and S3 are executed for both the image for learning to which the correct label is assigned and the image for learning to which the correct label is not assigned.

When the pseudo label is considered as an absolute value, the pseudo label may not coincide to the correct label (i.e., the actually measured distance to the subject). For this reason, in the third learning method, a method of using the pseudo label as not the absolute value but the relative value and identifying the absolute value by the correct label is adopted.

More specifically, in the third learning method, the statistical model is caused to learn with formula (7) for minimizing the value of a loss function as described below.

$$\theta' = \operatorname*{argmin}_{\theta} \lambda_1 \sum_{(x,y,z',I) \in N_{GT}} |z_{GT} - f(I, x, y; \theta)| + \lambda_2 \sum_{(x,y,z',I)_i,(x,y,z',I)_i \in N} |(z'_{i+1} - z'_i) - (f(I_{i+1}, x, y; \theta) - f(I_i, x, y; \theta))|$$  Formula (7)

The loss function in the formula (7) includes a first term weighted by any parameter $\lambda_1$ and a second term weighted by any parameter $\lambda_2$.

$N_{GT}$ in the first term in the formula (7) refers to a set of images for learning I assigned the correct labels, of the above-described N (i.e., a set of images for learning), including a tuple (x, y, z', I) of the coordinates x and y of the pixels configuring the images for learning I, the pseudo label z' of the pixels, and the image for learning I. In addition, $z_{GT}$ in the first term in the formula (7) is the correct label (i.e., the actual distance) assigned to the pixel configuring the images for learning I of $N_{GT}$.

That is, the first term in the formula (7) indicates calculating and summing differences between the correct labels $z_{GT}$ assigned to the pixels configuring the images for learning I and the predictive values corresponding to the pixels, with respect to all the pixels configuring the images for learning I included in $N_{GT}$.

In contrast, N in the second term in the formula (7) refers to a set of all images for learning I (i.e., images for learning assigned the correct labels and images for learning assigned no correct labels), including a tuple (x, y, z', I) i of i-th image for learning I and a tuple (x, y, z', I) i+1 of i+1-th image for learning I. Incidentally, x and y in the tuple of the i-th image for learning I refer to coordinate values of the pixels configuring the images for learning I, and z' refers to the pseudo label of the pixels. The tuple of the i+1-th image for learning I has the same configuration.

Furthermore, $z_{i+1}'$ in the second term in the formula (7) refers to the pseudo label of the pixel (x, y) configuring the i+1-th image for learning I, and $z_i'$ refers to the pseudo label of the pixel (x, y) configuring the i-th image for learning I.

In addition, in the second term in the formula (7), f ($I_{i+1}$, x, y; $\theta$) refers to the predictive value for the pixel (x, y) configuring the i+1-th image for learning I (i.e., the distance output from the statistical model f ($I_{i+1}$, x, y; $\theta$)), and f ($I_i$, x, y; $\theta$) refers to the predictive value for the pixel (x, y) configuring the i-th image for learning I (i.e., the distance output from the statistical model f ($I_i$, x, y; $\theta$)).

That is, according to the formula (7), the parameter $\theta'$ by which a value obtained by adding the value of the second term to the value of the first term becomes minimum can be obtained.

In the third learning method, it is possible to cause the statistical model to learn the image for learning by updating the parameter $\theta$ of the statistical model to the parameter $\theta'$ obtained by using the above formula (7).

Incidentally, each of the weight parameter $\lambda_1$ for the first term and the weight parameter $\lambda_2$ for the second term as included in the formula (7) may be a value of 0 or more.

In addition, the third learning method may be combined with the second learning method. In this case, the parameter $\theta'$ may be obtained by using a formula formed by further adding the regularization term in the formula (6) to the first and second terms in the formula (7).

Figure 11:
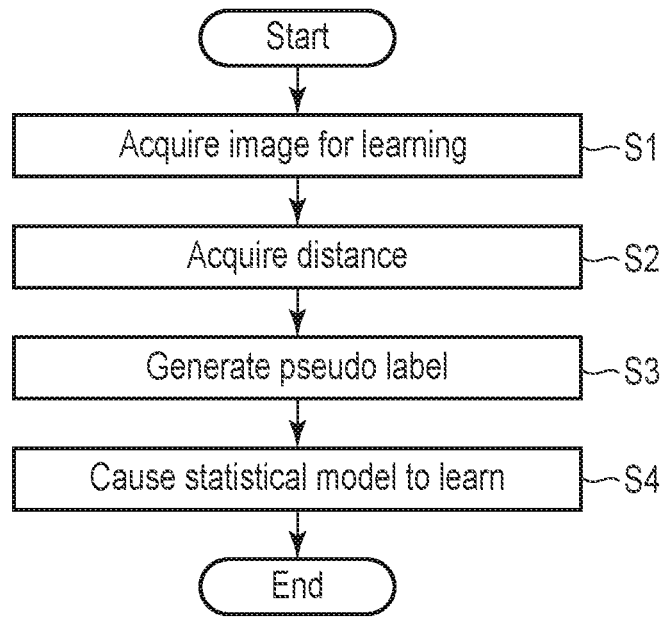
FIG. 11 is a flowchart showing an example of a procedure of an image processing device when causing the statistical model to learn.

Learning of the statistical model using the image for learning which is not assigned the correct label can be implemented by executing the above process shown in FIG. 11.

Figure 12:
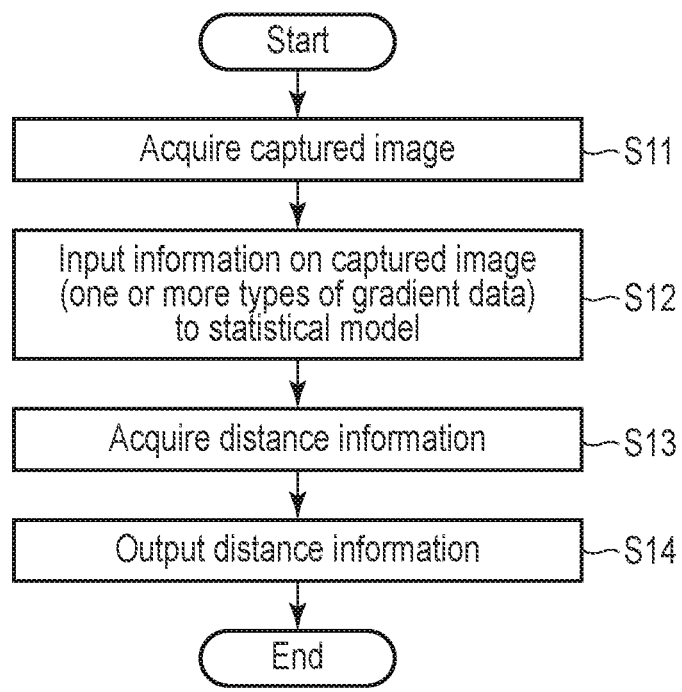
FIG. 12 is a flowchart showing an example of a procedure of an image processing device when acquiring distance information from the captured image.

Next, an example of the procedure of the image processing device 3 when acquiring the distance information from the captured image by using the statistical model which is caused to learn the image for learning by executing the above-described process shown in FIG. 11 will be described with reference to the flowchart of FIG. 12.

First, the capture device 2 (image sensor 22) captures a subject and thereby generates a captured image including the subject. The captured image is an image affected by the aberration of the optical system (lens 21) of the capture device 2 as described above.

The image acquisition module 32 included in the image processing device 3 acquires the captured image from the capture device 2 (step S11).

Next, the distance acquisition module 33 inputs the information on the captured image acquired in step S11 to the statistical model stored in the statistical model storage 31 (step S12). Incidentally, the information on the captured image input to the statistical model in step S12 includes the gradient data of each of the pixels configuring the captured image.

When the process of step S12 is executed, the distance to the subject is predicted in the statistical model. The statistical model outputs the predicted distance. The distance acquisition module 33 thereby acquires the distance information indicating the distance output from the statistical model (step S13). Incidentally, the distance information acquired in step S13 includes the distance for each of the pixels configuring the captured image acquired in step S11.

When the process of step S13 is executed, the output module 34 outputs the distance information acquired in step S13, for example, in a map format in which the distance information is arranged in association with the captured image in terms of the location (step S14). Incidentally, in the present embodiment, the distance information is output in the map format. However, the distance information may be output in the other format.

As described above, in the present embodiment, the image for learning including the subject of the already known shape is acquired, the distance (first distance) is acquired from the image for learning to the subject, and the distance restrained with the shape of the subject included in the image for learning, and thereby the statistical model is caused to learn.

In the present embodiment, the pseudo label is generated from the distance (i.e., the first distance is corrected to the second distance) by restraining the distance acquired from the image for learning with the shape of the subject included in the image for learning. Incidentally, the shape of the subject included in the image for learning in the present embodiment is assumed to be the shape which can be expressed by any function including the parameter, and the pseudo label is generated by making the parameter used to represent the shape of the subject fitting to the distance acquired from the image for learning.

In the present embodiment, even when the correct label is not assigned to the image for learning, the configuration enables the statistical model to learn with the data set including the image for learning and the pseudo label (second distance). Therefore, simplicity of learning in the statistical model can be improved.

In addition, in the present embodiment, the statistical model can be caused to learn by applying at least one of the first to third learning methods.

In the first learning method, the parameter of the statistical model is updated such that the difference between the pseudo label and the distance (third distance), which is output from the statistical model by inputting the image for learning to the statistical model, (i.e., the value of the loss function in the formula (5)) is minimized. According to the first learning method, the statistical model which enables the distance of a high accuracy to the image for learning (observed image) to be output can be obtained by directly teaching the statistical model with the false model.

In the second learning method, the statistical model is regularized. More specifically, in the second learning method, the parameter of the statistical model is updated such that the difference between the relative value of the pseudo label and the relative value of the distance (predictive value), which is output from the statistical model by inputting the image for learning to the statistical model, (i.e., the value of the regularization term in the formula (6)) is minimized. In the second learning method, by executing regularization with the relative value of the pseudo label of each pixel (coordinate point) on the image for learning and the relative value of the predictive value corresponding to the pixel, the statistical model can be caused to learn in the manner of objectively observing the shape of the subject even when the absolute difference (i.e., the difference between the pseudo label and the predictive value) is large.

Incidentally, in the formula (6) described in the second learning method, the parameter which minimizes the value of the objective function formed by adding the regularization term to the loss function in the above first learning method is obtained. However, each of the weight parameters ($\lambda_1$ and $\lambda_2$) of the loss function and the regularization term can be adjusted. According to this, when the second leaning method is applied, causing the statistical model to learn while putting emphasis on the difference between the absolute values (i.e., the loss function) or causing the statistical model to learn while putting emphasis on the difference between the relative values (i.e., the regularization term) can be selected (set).

In the third learning method, the parameter of the statistical model is updated so as to minimize the value obtained by adding the difference between the relative value of the pseudo label generated from the distance acquired from the image for learning (second image for learning) and the relative value of the distance (predictive value) output from the statistical model by inputting the image for learning (second image for learning) to the statistical model, to the difference between the correct label and the distance (predictive value) output from the statistical model by inputting the image for learning (first image for learning) to the statistical model. In the third learning method, since the statistical model is caused to learn by combining the correct label (absolute value) with the pseudo label (relative value), the statistical model capable of outputting the distance of a higher accuracy can be obtained.

That is, in the present embodiment, for example, when the statistical model (preliminarily trained model) is once generated with a data set including the image for learning captured by one lens (capture device) and the correct label assigned to the image for learning, relearning of the statistical model can easily be executed with the image for learning to which the correct label is not assigned.

Incidentally, in the present embodiment, it is described that the statistical model is caused to learn by applying at least one of the first to third learning methods. However, the learning method applied in the present embodiment may be selected in accordance with, for example, the type of the subject included in the image for learning, and the like or may be selected in accordance with the characteristics of the learning target lens (telephoto lens, fish-eye lens, and the like).

In addition, in the present embodiment, the pseudo label is generated based on the distance acquired from the image for learning by using the statistical model stored in the statistical model storage 31, and the statistical model is caused to relearn by using the image for learning and the pseudo label. However, (the data set including) the image for learning and the pseudo label may be used to cause the other statistical model to learn (generate the other statistical model).

Furthermore, in the present embodiment, it is described that the distance to the subject is acquired from the image for learning by using the statistical model stored in the statistical model storage 31 and the pseudo label is generated. However, the distance may be acquired based on a two-dimensional code such as an AR marker attached to the subject included in the image for learning. That is, the image processing device 3 according to the present embodiment may be configured to acquire the predictive value of the distance to the subject (i.e., the value whose correctness cannot be assured) from the image for learning. The method of acquiring the distance from the image for learning may be a method other than that described in the present embodiment. Incidentally, the distance to the subject as used to generate the pseudo label may be measured by applying a laser beam to the subject (i.e., laser measurement).

In addition, in the present embodiment, the statistical model is generated by learning the image affected by the aberration of the optical system (i.e., bokeh changing nonlinearly in accordance with the distance to the subject included in the image). For example, however, the statistical model may be generated by learning the image generated based on the light passed through the filter (i.e., color filter or the like) provided at the opening portion of the capture device 2 (i.e., bokeh which is intentionally generated on the image by the filter and which changes nonlinearly in accordance with the distance to the subject).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method of causing a statistical model for outputting a distance to a subject to learn by using an image including the subject as an input, the method comprising:
    acquiring an image for learning including a subject having an already known shape;
    acquiring a first distance to the subject included in the image for learning, from the image for learning; and
    causing the statistical model to learn by restraining the first distance with the shape of the subject included in the image for learning, wherein the causing the statistical model to learn comprises:
correcting the first distance to a second distance, based on the shape of the subject included in the image for learning; and
causing the statistical model to learn the image for learning and the second distance,
the image for learning comprises a first image for learning to which a correct label is assigned and a second image for learning to which the correct label is not assigned,
the first and second images for learning include subjects of the same shape,
the acquiring the first distance comprises acquiring a first distance to the subject included in the first image for learning, from the second image for learning,
the first distance is corrected to a second distance, based on the shape of the subject included in the second image for learning, and
the causing the statistical model to learn comprises updating a parameter of the statistical model so as to minimize a value obtained by adding a difference between a relative value of the second distance and a relative value of the third distance output from the statistical model by inputting the second image for learning to the statistical model, to a difference between a correct label and the third distance output from the statistical model by inputting the first image for learning to the statistical model.

2. The method of claim 1, wherein
the correcting comprises correcting the first distance to the second distance by fitting a parameter used to express the shape of the subject to the first distance.

3. The method of claim 2, wherein
the shape of the subject is expressed by any function including the parameter.

4. The method of claim 1, wherein
the causing the statistical model to learn comprises updating a parameter of the statistical model so as to minimize a difference between the second distance and a third distance output from the statistical model by inputting the image for learning to the statistical model.

5. The method of claim 1, wherein
the causing the statistical model to learn comprises regularizing the statistical model.

6. The method of claim 5, wherein
the regularizing the statistical model comprises updating a parameter of the statistical model so as to minimize a difference between a relative value of the second distance and a relative value of a third distance output from the statistical model by inputting the image for learning to the statistical model.

7. The method of claim 1, wherein
the statistical model is generated by learning bokeh which occurs in an image affected by aberration of an optical system and which changes nonlinearly in accordance with the distance to the subject included in the image.

8. The method of claim 1, wherein
the statistical model is generated by learning bokeh which occurs in an image generated by light passed through a filter and which changes nonlinearly in accordance with the distance to the subject included in the image.

9. The method of claim 1, wherein
the acquiring comprises acquiring a distance output from the statistical model by inputting the image for learning to the statistical model.

10. The method of claim 1, wherein
the acquiring comprises acquiring a distance, based on a marker assigned to the subject included in the image for learning.

11. A non-transitory computer-readable storage medium having stored thereon a computer program which is executable by a computer and causes a statistical model for outputting a distance to a subject to learn by using an image including the subject as an input, the computer program comprising instructions capable of causing the computer to execute functions of:
acquiring an image for learning including a subject having an already known shape;
acquiring a distance to the subject included in the image for learning, from the image for learning; and
causing the statistical model to learn by restraining the acquired distance with the shape of the subject included in the image for learning, wherein
the causing the statistical model to learn comprises:
correcting the first distance to a second distance, based on the shape of the subject included in the image for learning; and
causing the statistical model to learn the image for learning and the second distance,
the image for learning comprises a first image for learning to which a correct label is assigned and a second image for learning to which the correct label is not assigned,
the first and second images for learning include subjects of the same shape,
the acquiring the first distance comprises acquiring a first distance to the subject included in the first image for learning, from the second image for learning,
the first distance is corrected to a second distance, based on the shape of the subject included in the second image for learning, and
the causing the statistical model to learn comprises updating a parameter of the statistical model so as to minimize a value obtained by adding a difference between a relative value of the second distance and a relative value of the third distance output from the statistical model by inputting the second image for learning to the statistical model, to a difference between a correct label and the third distance output from the statistical model by inputting the first image for learning to the statistical model.

12. An image processing device for causing a statistical model for outputting a distance to a subject to learn by using an image including the subject as an input, the device comprising:
a processor configured to:
acquire the image for learning including a subject having an already known shape;
acquire a distance to the subject included in the image for learning, from the image for learning; and
cause the statistical model to learn by restraining the acquired distance with the shape of the subject included in the image for learning, wherein
the processor is configured to:
correct the first distance to a second distance, based on the shape of the subject included in the image for learning; and
cause the statistical model to learn the image for learning and the second distance,
the image for learning comprises a first image for learning to which a correct label is assigned and a second image for learning to which the correct label is not assigned, the first and second images for learning include subjects of the same shape, the processor is configured to acquire a first distance to the subject included in the first image for learning, from the second image for learning, the first distance is corrected to a second distance, based on the shape of the subject included in the second image for learning, and the processor is configured to update a parameter of the statistical model so as to minimize a value obtained by adding a difference between a relative value of the second distance and a relative value of the third distance output from the statistical model by inputting the second image for learning to the statistical model, to a difference between a correct label and the third distance output from the statistical model by inputting the first image for learning to the statistical model.

\* \* \* \* \*